(Model.)

H. F. BARTLETT.
CASING FOR BURNERS.

No. 367,583.  Patented Aug. 2, 1887.

Witnesses.
N. A. Haseltine.
O. A. Haseltine

Inventor.
Henry F. Bartlett
By S. A. Haseltine & Bro.
Attorneys.

UNITED STATES PATENT OFFICE.

HENRY F. BARTLETT, OF SPRINGFIELD, MISSOURI, ASSIGNOR TO JOHN B. CARSON, S. A. AND S. C. HASELTINE, E. B. LLOYD, AND M. J. BARTLETT, ALL OF SAME PLACE.

CASING FOR BURNERS.

SPECIFICATION forming part of Letters Patent No. 367,583, dated August 2, 1887.

Application filed October 23, 1885. Serial No. 180,723. (Model.)

*To all whom it may concern:*

Be it known that I, HENRY F. BARTLETT, a citizen of the United States, residing at Springfield, in the county of Greene and State of Missouri, have invented certain new and useful Improvements in Casings for Burners; and I do hereby declare the following to be a full, clear, and exact description of the invention, such as will enable others skilled in the art to which it appertains to make and use the same.

My invention relates to casings and drums for oil or gas stoves; and it consists in the construction hereinafter more fully described, and specifically pointed out in the claims.

Figure 1:
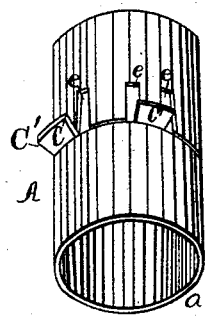
Figure 2:
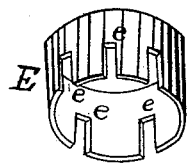
Figure 3:
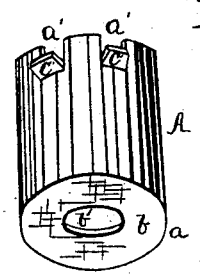
Figure 4:
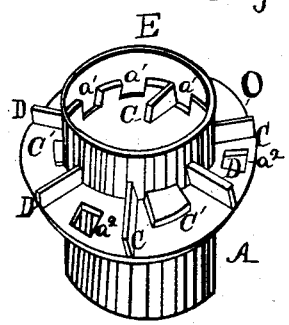

Figure 1 is a bottom and side view of the casings, open below. Fig. 2 is a view of the top casing. Fig. 3 is a bottom and side view of the lower casing, closed below. Fig 4 is a view in elevation with the grate attached.

Similar letters of reference indicate corresponding parts in the several figures.

A is a sleeve or casing around the burner of the lamp or stove, and may be made of any suitable material with the lower end open, but may be made closed by a bottom piece, $b$, so as to prevent the heat from escaping down by the sides of the burner. Said bottom piece, $b$, is preferably provided with a suitable hole, $b'$, for receiving the burner or jet pipe. The top of sleeve A is provided with slots $a'$ for the purpose of allowing the bars C to pass in and to permit the heat to pass out when not using an oven. Said sleeve A is also provided with ears C'. Said ears are preferably made by bending the parts down which are taken out to form the slots when the sleeve A is made of any suitable material that may be bent, and when made of cast-iron they are preferably cast onto the sides of the sleeve.

E is an upper sleeve, which is made with slots $e$ at its lower edge, so as to fit over the bars C, and is made so as to fit close around the top of sleeve A, so as to close all of the holes or slots $a'$, and thus drive all of the heat direct into an oven when one is used. Said upper sleeve may be omitted, except when it is desired to conduct the heat into the flue or oven.

Having thus described my invention, what I claim as new, and desire to secure by Letters Patent, is—

1. In a casing for a lamp, gas, or gasoline burner, a part, A, having slots $a'$ and ears C', combined with a grate, O, substantially as shown and described.

2. A casing for a lamp, gas, or gasoline burner, consisting of a part, A, having slots $a'$, ears C', and bottom $b$, said bottom having an opening, $b'$, combined with a grate, O, substantially as shown and described, and for the purpose set forth.

3. In a casing for a lamp, gas, or gasoline burner, the combination of a casing, A, having slots $a'$ and ears C', and grate O, with an upper casing, E, having slots $e$ in its lower edge, substantially as and for the purpose set forth.

4. In a lamp, gas, or gasoline burner, the combination of the casing A, having slots and ears, and casing E, having slots in its lower edge, with a grate, substantially as shown and described, and for the purpose set forth.

In testimony whereof I affix my signature in presence of witnesses.

HENRY F. BARTLETT.

Witnesses:
J. B. CARSON,
S. C. HASELTINE.